D. ARNDT.
Bee Hive.
No. 4,502. Patented May 9, 1846.
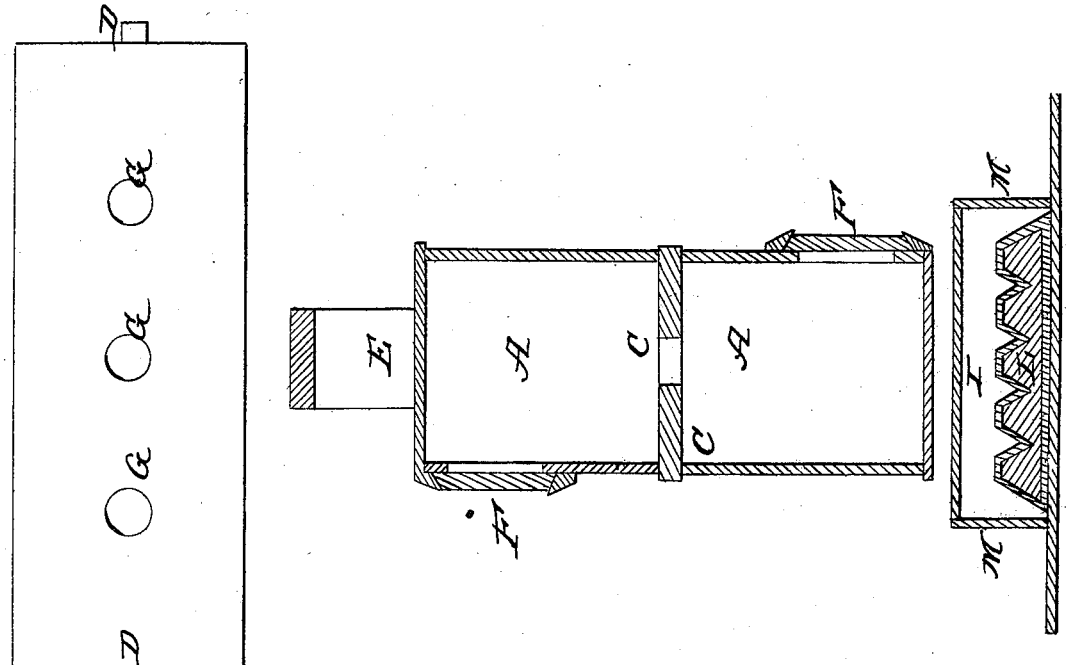
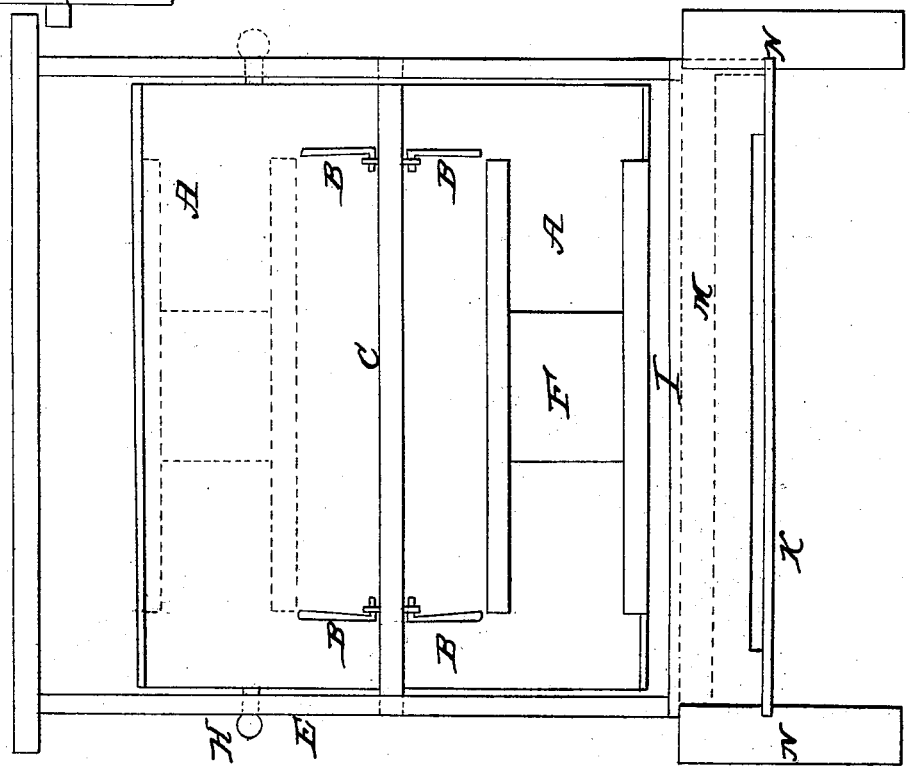

UNITED STATES PATENT OFFICE.

DANIEL ARNDT, OF WEST MIDDLETOWN, PENNSYLVANIA.

BEEHIVE.

Specification of Letters Patent No. 4,502, dated May 9, 1846.

*To all whom it may concern:*

Be it known that I, DANIEL ARNDT, of West Middletown, in the county of Washington, State of Pennsylvania, have invented a new and useful Improvement for Protecting Bees from the Ravages of the Bee-Moth, (the invention is called a Cloth Moth-Harbor,) and that the following is a full and exact description of the construction and operation of said improvement as invented by me.

The letters herein used having reference to the drawing, accompanying this specification and forming part thereof, A A is a bee hive consisting of two boxes, and connected by the hooks B B with the center board C which terminates in two pins or journals D, D working in suitable seats in the side pieces E E. By means of these pins the two boxes have a rotary motion and are thereby enabled to reverse their position. This center board is pierced with several holes to enable the bees to pass from one part of the hive to another. In each of the boxes forming the hive, are placed a pane of glass admitting light into it, which panes are covered by the slides F, so that when one compartment has been filled with the wax and honey the hive may be turned on its journals D, D the full hive brought down below and the slide F opened, thereby admitting light into the hive, and compelling the bees to seek the upper compartment into which they can pass by means of the holes G in the center boards C. The hive is retained in its position by the pins H passing through the side frames E. Directly under this rotary hive is placed a board I lined on the lower side with cloth, and at a convenient distance below this another board K lined with cloth on the upper side, these two pieces forming the top and bottom of the cloth moth harbor. Between these is placed a block of wood L grooved in its longest direction and also lined with cloth the grooves being for the purpose of receiving the eggs laid by the moth, when attracted to the harbor by the warmth of the cloth. The harbor is closed from without by means of the sliding pieces M which work in grooves cut in the side pieces, N a recess being made in the aforesaid slides, and also in the top of the harbor for the insect to pass through when wishing to enter it. The grooved piece L is not attached to any part of the harbor but can be taken out at the pleasure of the cultivator of the bees.

What I claim as new, and as my invention and discovery in the above described apparatus, and for which I ask exclusive privilege by Letters Patent of the United States is—

The cloth moth harbor by protecting the bees and their labors from the ravages of the moth—the moth being induced through the warmth of the cloth lining of the harbor to deposit its eggs therein instead of in the hive.

DANIEL ARNDT.

Witnesses:
N. R. WADE,
R. MORROW.